United States Patent Office 3,822,180
Patented July 2, 1974

3,822,180
METHOD FOR MANUFACTURING SULFITE PULP COOKING LIQUOR FROM SULFITE PULP SPENT LIQUOR
Akio Mita and Toshio Ishida, Tokyo, Japan, assignors to Agency of Industrial Science & Technology, Tokyo, Japan
Continuation-in-part of application Ser. No. 101,984, Dec. 28, 1970, now Patent No. 3,719,705. This application Dec. 20, 1972, Ser. No. 317,054
Claims priority, application Japan, Dec. 27, 1969, 45/1,046; Jan. 20, 1970, 45/5,270
Int. Cl. D21c 11/02, 11/14
U.S. Cl. 162—36      4 Claims

ABSTRACT OF THE DISCLOSURE

Sulfite pulp cooking liquor is produced from sulfite pulp spent liquor by combusting condensed sodium-base spent liquor in a reducing atmosphere, sulfuric acid is added to the resultant smelt to produce an acid solution to which lime is added and into which sulfur dioxide gas is blown and the calcium sulfate produced is separated.

REFERENCE TO RELATED APPLICATION

This is a continuation-in-part of our copending application Ser. No. 101,984, filed Dec. 28, 1970, now U.S. Pat. No. 3,719,705.

BACKGROUND OF THE INVENTION

This invention relates to a method for treating sodium-base sulfite pulp spent liquor (hereinafter referred to as SP spent liquor) thereby reclaiming sulfite cooking liquor therefrom and obtaining calcium sulfate as a by-product.

Heretofore, there have been proposed various methods for the utilization of SP spent liquor which is produced in large quantities in the production of SP. And, some of these methods have already been reduced to practical use. Yet, it is only a very small portion of the SP spent liquor that is now utilized for the purpose of such reclamation. The bulk of the spent liquor is discarded into rivers and is raising a serious issue of water pollution.

The methods so far proposed and brought to public knowledge include a method [TAPPI: Vol. 40, p. 587 (1957)] whereby SP spent liquor is evaporated and subsequently combusted in a reducing atmosphere to afford a smelt composed predominantly of sodium sulfide and sodium carbonate which smelt is then directly sulfited, a method [TAPPI: Vol. 43, p. 699 (1960)] whereby the smelt is carbonated and the carbonated liquor is further sulfited, and a method [Paper Trade Journal: Vol. 151, pp. 38 and 65 (1967)] whereby the carbonation of smelt is enhanced and sodium bicarbonate obtained consequently in the form of precipitate is separated and further sulfited.

However, these methods involve complicated stages of treatment and the sodium sulfite obtained thereby as the end product has a low purity and contains a noticeable amount of sodium thiosulfate, a substance impedimental to the SP cooking. Therefore, these methods are defective in that the product, in its unmodified state, cannot be recycled in the sulfite cooking of wood chip.

From the standpoint of heat balance, it is considered fairly advantageous to carry out the combustion of the condensed SP spent liquor in an oxidizing atmosphere as it has a larger sulfur content in the dry matter than the kraft pulp spent liquor (hereinafter referred to as KP spent liquor). However, no successful method has ever been developed for reclaiming sulfite cooking liquor from the ashes which are obtained when a spent liquor of a rich ash content, like SP spent liquor, is combusted in a perfectly oxidizing atmosphere.

The object of this invention is to provide a method for reclaiming sulfite cooking liquor through complete treatment of SP spent liquor.

Another object of this invention is to provide a method for manufacturing pulp cooking liquor from sulfite pulp spent liquor by utilizing either spent sulfuric acid or iron-containing spent sulfuric acid.

SUMMARY OF THE INVENTION

To accomplish the aforementioned objects, the method for manufacturing pulp cooking liquor from sulfite pulp spent liquor in accordance with the present invention involves the steps of first concentrating the sodium-base pulp spent liquor obtained in consequence of the collection of pulp and subsequently converting it into a smelt by combustion. Then, sulfuric acid is added to this smelt until the resulting solution assumes acidity. Then, lime is added to the resultant acid aqueous solution of sulfuric acid and sulfur dioxide gas is blown into the solution to induce precipitation of calcium sulfate, which is separated from the solution. The aqueous solution of sodium hydrogen sulfite thus obtained is neutralized, as occasion demands, with an alkali to give rise to the aqueous solution of sodium sulfite. The aqueous solution of sodium hydrogen sulfite or the neutral aqueous solution of sodium sulfite thus produced is used as the pulp cooking liquor.

In case where iron-containing spent sulfuric acid is to be utilized, the smelt obtained by concentrating and combusting the sodium-base pulp spent liquor is dissolved with the iron-containing sulfuric acid added thereto. The resulting solution is alkalized by the incorporation of an alkali and then deprived of the iron component by means of air oxidation. Lime is added to the resultant alkaline aqueous solution of sodium sulfate and then sulfur dioxide gas is blown therein to induce precipitation of calcium sulfate, which is subsequently separated from the solution. The aqueous solution of sodium hydrogen sulfite formed consequently is neutralized with an alkali to give rise to aqueous solution of sodium sulfite, which is put to use as the pulp cooking liquor.

Other objects and other characteristic features of the present invention will become apparent from a further detailed description of the invention to be made hereinafter with reference to the accompanying drawings.

DETAILED DESCRIPTION OF THE INVENTION

The inventors pursued various studies with respect to the treatment of sodium-base sulfite pulp spent liquor. They have consequently made a discovery that addition of sulfuric acid to sodium sulfide results in production of sodium sulfate and hydrogen sulfide, that addition of sulfuric acid to sodium carbonate leads to formation of sodium sulfate and carbon dioxide gas and that addition of lime to sodium sulfate brings about a sulfiting reaction to produce calcium sulfate and sodium hydrogen sulfite respectively as shown below:

$$Na_2S + H_2SO_4 = Na_2SO_4 + H_2S$$

$$Na_2CO_3 + H_2SO_4 = Na_2SO_4 + H_2O + CO_2$$

$$Na_2SO_4 + Ca(OH)_2 + 2SO_2 = 2NaHSO_3 + CaSO_4$$

When the resultant sodium hydrogen sulfite is further neutralized with sodium hydroxide or lime, there is formed sodium sulfite as shown in the following formulas:

$$NaHSO_3 + NaOH = Na_2SO_3 + H_2O$$

$$2NaHSO_3 + Ca(OH)_2 = Na_2SO_3 + CaSO_3 + 2H_2O$$

The method of the present invention, based on the knowledge mentioned above, seeks to reclaim the pulp cooking liquor by the treatment of sodium-base sulfite pulp spent liquor.

Figure 1:
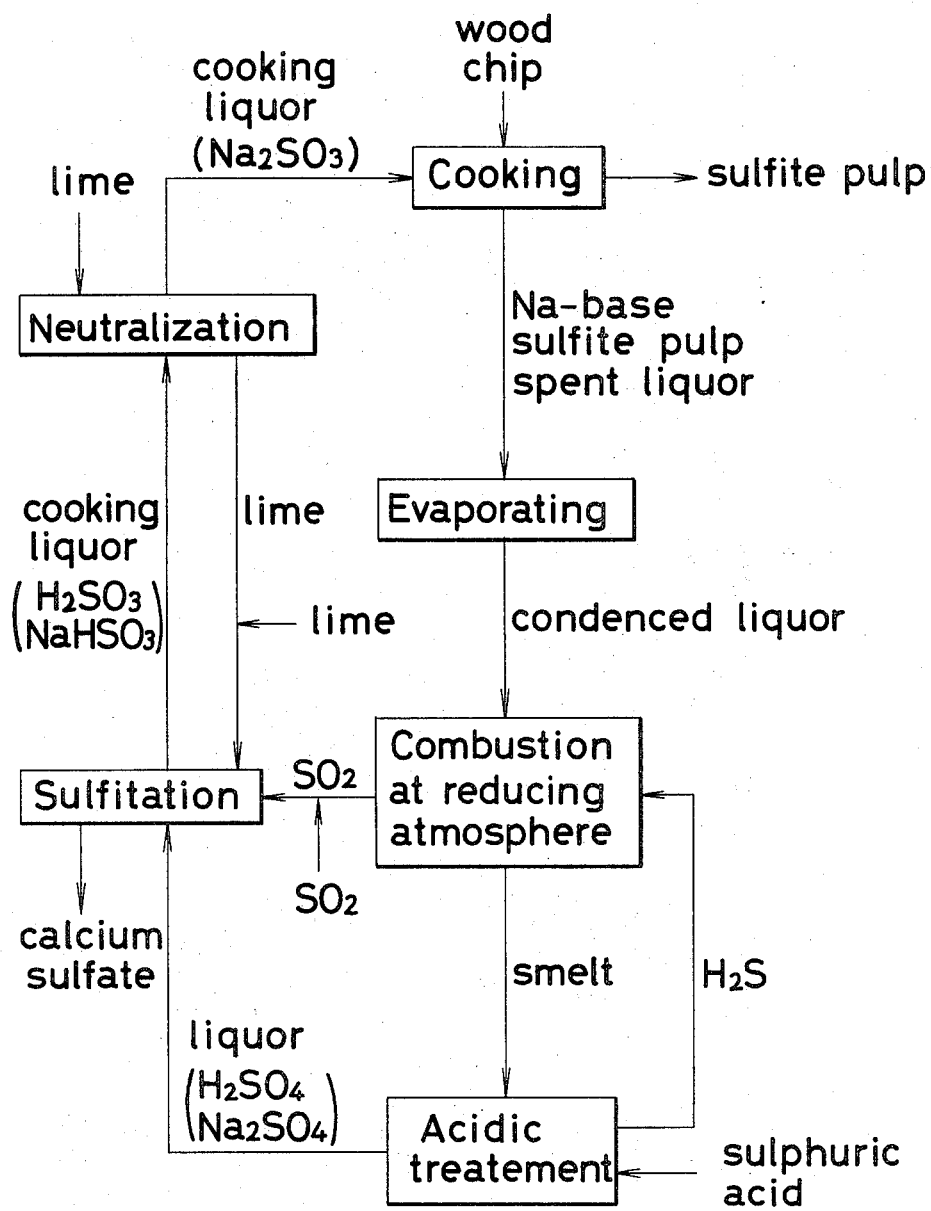
FIG. 1 is a flow sheet illustrating embodiment of the method used for manufacturing the sodium-base pulp cooking liquor from the sulfite pulp spent liquor in accordance with the present invention.

Referring to FIG. 1, the sodium-base SP spent liquor which is obtained after cooking wood chip and separating the pulp is first evaporated to 30–55% of solids concentration and then combusted in a reducing atmosphere at 920–970° C. to afford a smelt. The present method is applicable to various forms of sodium-base SP spent liquors such as are obtained from acid, neutral, alkali and two-stage cooking processes. Particularly, it is applicable to even the neutral sulfite semichemical pulp spent liquor which has defied satisfactory treatment by conventional methods.

The reducing atmosphere can be obtained by utilizing the organic matter which is a component of the sodium-base SP spent liquor, the smelt which is produced at the time of combustion, and carbon monoxide.

The smelt thus obtained is generally composed of 20–35 wt. percent of sodium sulfide, 5–20 wt. percent of sodium sulfate, 45–55 wt. percent of sodium carbonate, 2–5 wt. percent of sodium thiosulfate, 1–3 wt. percent of sodium sulfite, 0.1–1 wt. percent of silica, and 0.1–1 wt. percent of iron. This smelt is dissolved with sulfuric acid to form an acid sulfate solution. In this case, it is appropriate to use sulfuric acid of a concentration of 30–75%. The spent sulfuric acid (5% $H_2SO_4$ and 10% sodium sufate) which is produced in the manufacture of viscose rayon, staple fiber or cellophane or the spent sulfuric acid (20% $H_2SO_4$ and 20% $FeSO_4$) which occurs in the manufacture of titanium white or iron can also be used for this purpose.

Where a spent sulfuric acid containing sodium sulfate is used for dissolving the smelt, the dissolution of smelt is accomplished by adding this spent sulfuric acid until the solution becomes acidic. When the solution is acidified with sulfuric acid, the sodium thiosulfate present therein is converted into sodium sulfite as indicated by the following formula. Thus, the sulfite cooking liquor obtained will contain almost no sodium thiosulfate.

$$Na_2S_2O_3 = Na_2SO_3 + S$$

This solution is combined with lime added thereto and, thereafter, sulfur dioxide gas is blown amply into the mixture until the formation of new gypsum ceases to occur. As a lime, there may be used calcium hydroxide, calcium carbonate or calcium sulfite. Such lime may contain a considerably larger amount of impurities where the plaster to be produced is not required to be snow-white. In this case, therefore, the carbide residue or similar matter which has to date been discarded as useless can be utilized. The sulfur dioxide which is produced in the aforementioned combustion in the reducing atmosphere can be used here.

On completion of the reaction, the solution is treated by an ordinary method for the separation of the liquid phase from the precipitate.

The liquid thus separated contains sodium bisulfite and sulfur dioxide gas and, therefore, can be used in its unmodified state as sulfite cooking liquor. Otherwise, it may be neutralized with lime to afford a sulfur cooking liquor containing sodium sulfite. The calcium sulfite which is produced at the time of neutralization can be used as a lime component during the sulfitation treatment.

Figure 2:
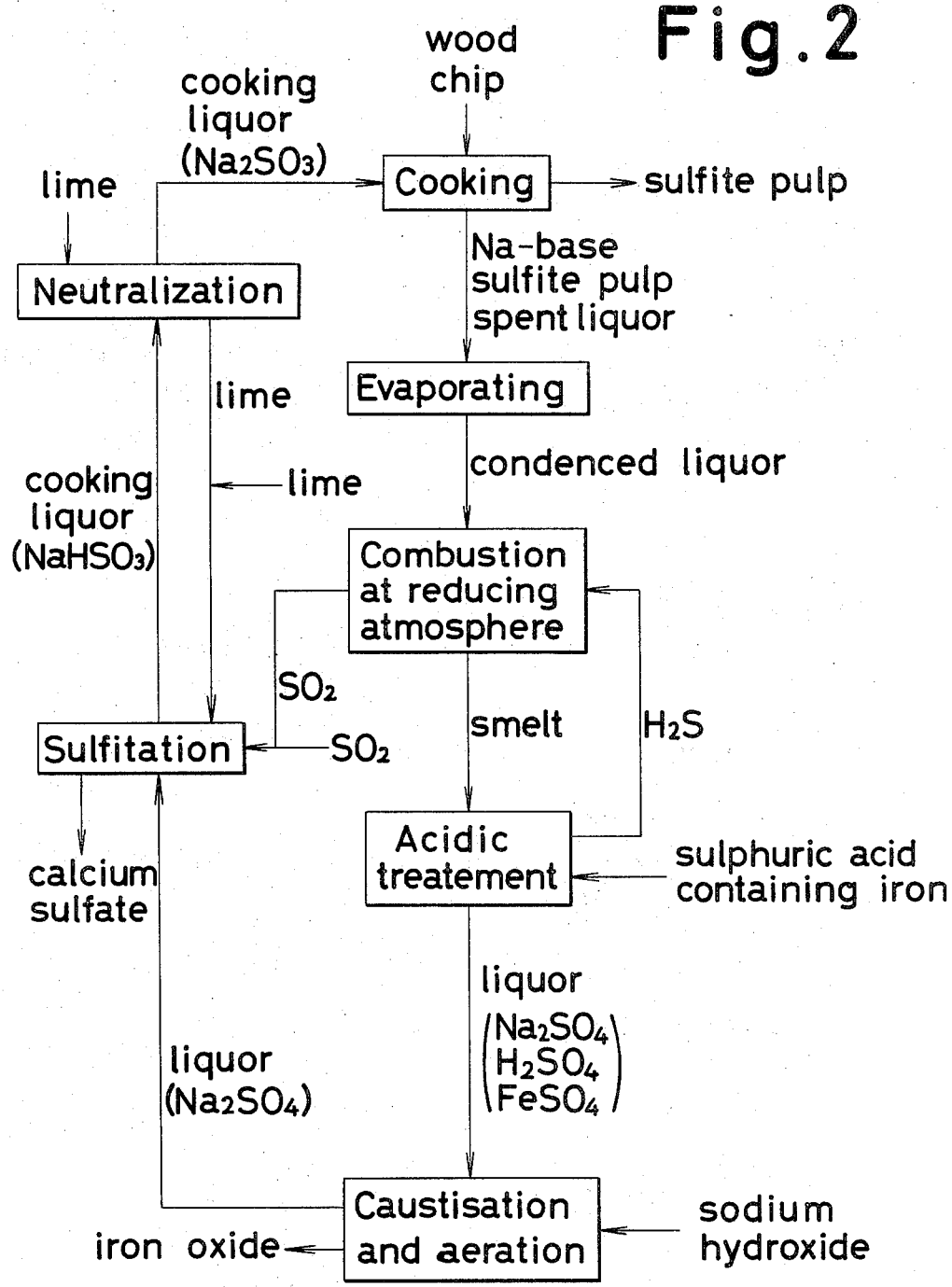
FIG. 2 is a flow sheet illustrating another embodiment of the method in accordance with the present invention.

The precipitate, when dried and calcined at 120–150° C., newly produces a calcined plaster at a theoretical yield.

Where the spent sulfuric acid to be used contains iron, there is followed the procedure illustrated in FIG. 2, which comprises adding the spent sulfuric acid to the smelt until the resultant solution becomes acidic, then alkalinizing the solution by adding thereto such alkali substance as sodium hydroxide or lime, and thereafter, subjecting the solution to air oxidation so as to remove the iron therefrom in the form of iron oxide. In this case, the lime to be used may contain impure substances at a considerably larger concentration. Thus, calcium carbide residue and similar matter may be used for this purpose.

In the same procedure as illustrated in FIG. 1, the separated alkali solution of sodium sulfate is combined with lime added thereto and, then, sulfur dioxide gas is blown into the mixture. The plaster which occurs as a precipitate is removed and the remaining solution is used as sulfite cooking liquor, after neutralization if necessary.

By using a procedure far simpler than that of any conventional method, the method of this invention accomplishes perfect treatment of sodium-base SP spent liquor to reclaim the sulfite cooking liquor and affords a calcined plaster as a by-product. When the sodium-base SP spent liquor is subjected to the combustion treatment together with KP spent liquor, the mist may be recovered and utilized as sulfite cooking liquor and the smelt as KP cooking liquor respectively.

In the sulfitation treatment, various forms of spent sulfuric acid can be utilized. In this respect, the method of the present invention serves two purposes, i.e., utilization of sodium-base SP spent liquor and disposal of spent sulfuric acid, at one time. Moreover, use of spent sulfuric acid containing sodium sulfate, such as is obtained from a rayon, staple fiber or cellophane plant, serves to make up for the shortage of sodium component during the recovery of sulfite cooking liquor. Use of spent sulfuric acid containing iron at a fairly high concentration such as is obtained in the production of iron or titanium white results in the by-production of iron oxide of good quality.

DESCRIPTION OF THE PREFERRED EMBODIMENT

Preferred embodiments of this invention are now cited hereinafter. It should be understood that this invention is not limited to these examples.

Example 1

A sodium-base SP spent liquor (pH 6.4, dry matter 158.8 g./l., S 12.4 g./l. and $Na_2O$ 30.1 g./l.) was evaporated to 55% of solids concentration and then combusted in a reducing atmosphere at furnace-bottom temperature of 950° C. to afford a smelt having the following composition.

| | Wt. percent |
|---|---|
| $Na_2S$ | 29.0 |
| $Na_2CO_3$ | 49.9 |
| $Na_2CO_4$ | 10.6 |
| $Na_2S_2O_3$ | 3.1 |
| $Na_2SO_3$ | 1.3 |
| $SiO_2$ | 0.2 |
| Fe | 0.2 |

By adding 2130 ml. of spent sulfuric acid from cellophane production ($Na_2SO_4$ 120 g./l., $H_2SO_4$ 56 g./l.) to 100 g. of this smelt, there was obtained an acid sulfuric acid solution of crude sulfuric acid (400 g. as $Na_2SO_4$). When 243 g. of carbide residue (containing 88% of $Ca(OH)_2$) was added to this acid solution and sulfur dioxide gas was then blown into the mixture, there was obtained acid sulfite solution of sodium bisulfite (containing 470 g. of $NaHSO_3$ and 298 g. of $SO_2$) together with a by-produced calcium sulfate which was isolated for recovery. By neutralizing this solution with 553 g. of sodium hydroxide, there was obtained an aqueous solution containing 1157 g. of sodium sulfite. When the aforementioned calcium sulfate was heated at 125° C. for 3 hours, there was produced 366 g. of greyish white calcined plaster.

Example 2

By following the procedure of Example, 1 a sodium-base SP spent liquor was evaporated and combusted to afford a smelt. 100 g. of this smelt was dissolved in 400 ml. of water and the solution was combined with an iron-containing spent sulfuric acid (containing 96 g. of $FeSO_4$ and 107 g. of $H_2SO_4$). Consequently there was obtained a highly concentrated hydrogen sulfide-containing gas (28% of $H_2S$ and 72% of $CO_2$). At the same time, there was obtained an acid aqueous solution of sulfuric acid (pH 2.8) containing sodium sulfate and iron. Then, this acid aqueous solution of sulfuric acid was alkalinized (to pH 8.5) by adding thereto 166 g. of sodium hydroxide and, subsequently, oxidized by bubbling air therethrough so as to permit the existent iron to be removed from the aqueous solution practically quantitatively in the form of iron oxide at nearly the theoretical quantity. After separation of the iron oxide through filtration, there was obtained an alkaline aqueous solution of sodium sulfate (containing 276 g. of $Na_2SO_4$ and 1 g. of NaOH) as filtrate.

Subsequently, 156 g. of calcium hydroxide was added to this alkaline aqueous solution and sulfur dioxide gas was bubbled therethrough. By separating the resultant precipitate of calcium sulfate and then calcining the precipitate at 120° C. for about three hours, there was obtained 247 g. of calcined plaster. The solution which was obtained after removal of calcium sulfate was found to contain 355 g. of sodium sulfite, 86 g. of sulfur dioxide and a trace of iron and therefore was usable in its unmodified state as SP cooking liquor.

Example 3

By following the procedure of Example 1, sodium-base SP spent liquor was evaporated and then combusted to afford a smelt. 100 g. of this smelt was combined with 2130 ml. of spent sulfuric acid from cellophane production (containing 120 g./l. of $Na_2SO_4$ and 56 g./l. of $H_2SO_4$) and hydrogen sulfide which occurred consequently was recovered. Thus, there was obtained an acid aqueous solution of sodium sulfate (pH 2.5). This aqueous solution contained 392 g. of sodium sulfate and 6 g. of sulfuric acid. Separately, a mixed solution of calcium bisulfite and sodium bisulfite was prepared by adding crude calcium sulfite to sodium bisulfite, subjecting the mixture to sulfitation and removing the insoluble matter therefrom. This mixed solution was subjected to double decomposition by adding the aforementioned acid aqueous solution of sulfuric acid thereto. The precipitate which occurred in the double decomposition was removed and then thermally decomposed at 120° C. to afford 310 g. of snow-white calcined plaster. The aqueous solution containing sodium bisulfite resulting from the removal of the precipitate was neutralized with carbide residue added thereto. Subsequent to removal of the crude calcium sulfite produced in the form of precipitate, the neutralized solution was usable as SP cooking liquor (318 g. of $Na_2SO_3$ and 0.02 g. of iron).

What is claimed is:

1. A method for the manufacture of sulfite pulp cooking liquor from sulfite pulp spent liquor, comprising the steps of concentrating sodium-base pulp spent liquor obtained in consequence of the collection of pulp until the solid concentration thereof is elevated to about 30–55 percent, combusting the concentrated spent liquor at about 920–970° C. in a reducing atmosphere, adding sulfuric acid to the consequently formed smelt until the solution assumes acidity thereby producing an acid aqueous solution of sulfuric acid, incorporating lime into said acid aqueous solution of sulfuric acid, thereafter blowing sulfur dioxide gas amply therein until the formation of new gypsum ceases to occur, separating and removing the resultant precipitate of calcium sulfate and obtaining the aqueous solution of sodium hydrogen sulfite to be used as the pulp cooking liquor.

2. A method according to claim 1, further comprising neutralizing the aqueous solution of sodium hydrogen sulfite into aqueous solution of sodium sulfite.

3. A method for the manufacture of sulfite pulp cooking liquor from sulfite pulp spent liquor, comprising concentrating sodium-base pulp spent liquor obtained in consequence of the collection of pulp until the solid concentration thereof is elevated to about 30–55 percent, combusting the concentrated spent liquor at about 920–970° C. in a reducing atmosphere, adding iron-containing sulfuric acid to the consequently formed smelt until the resultant solution assumes acidity thereby producing an acid aqueous solution of sulfuric acid, alkalizing said acid aqueous solution of sulfuric acid by the incorporation of an alkali, thereafter blowing air therein for thereby converting the iron component into iron oxide for subsequent separation therefrom, adding lime to the remaining solution of sodium sulfate, subsequently blowing sulfur dioxide gas amply therein until the formation of new gypsum ceases to occur, separating and removing the resultant precipitate of calcium sulfate, and obtaining the aqueous solution of sodium hydrogen sulfite to be used as the pulp cooking liquor.

4. A method according to claim 3, further comprising neutralizing the aqueous solution of sodium hydrogen sulfite into aqueous solution of sodium sulfite.

References Cited

UNITED STATES PATENTS

| | | | |
|---|---|---|---|
| 2,802,791 | 8/1957 | Whitney et al. | 423—207 X |
| 2,010,077 | 8/1935 | Haglund | 423—512 X |

OTHER REFERENCES

Lundén, Bertil: *Stora Broby Recovery Process for Semi-Chemical Pulp Mills,* TAPPI, vol. 53, No. 9, September 1970, pp. 1726–31.

S. LEON BASHORE, Primary Examiner

W. F. SMITH, Assistant Examiner

U.S. Cl. X.R.

423—207, 519, 554, 555